United States Patent Office 3,262,929
Patented July 26, 1966

3,262,929
2-STYRYLBENZOXAZOLE COMPOUNDS
Ichiro Okubo and Michihiro Tsujimoto, Tokyo, Japan, assignors to Mitsui Kagaku Kogyo Kabushiki Kaisha, Tokyo, Japan, a corporation of Japan
No Drawing. Filed Aug. 31, 1962, Ser. No. 220,904
Claims priority, application Japan, Sept. 12, 1961, 36/33,202; July 18, 1962, 37/29,641
7 Claims. (Cl. 260—240)

This invention relates to novel 2-styryloxazole compounds.

It is an object of this invention to provide useful compounds for optical brightening of organic fibrous materials.

The novel 2-styryloxazole compounds of this invention have the structure represented by the general formula:

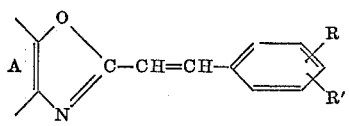

(I)

wherein A is a member selected from the group consisting of substituted benzene rings and unsubstituted naphthalene rings, which is condensed with the oxazole ring, substituents of said benzene rings being selected from the group consisting of alkyl-, aryl- and alkenylene-groups and R and R' are selected from hydrogen, halogen, cyano group, carboxyl group and its ester residue, alkyl group and aryl group.

2-styryloxazole compounds were little known in the past, although, for example, 2-styrylbenzoxazole and 2-(4'-dimethylaminostyryl)-benzoxazole were found (D. M. Brown, A. R. Kon, J. Chem. Soc., 1948, 2147).

The present inventors have synthesized a number of 2-stryyloxazole compounds to study precisely on their properties, and have found that the novel 2-styryloxazole compounds having the general Formula I exhibit a strong fluorescence and produce an excellent optical brightening effect when organic fibrous materials are treated with these novel compounds. That is, the novel 2-styrylox-azole compounds are very useful substances as the optical brightening agent for organic fibrous materials, particularly various man-made fibers, and light-fastness is excellent.

The novel 2-styryloxazole compounds of this invention can be prepared by condensation under dehydration of a 2-methxyloxazole compound represented by the following general formula:

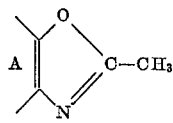

(II)

(wherein A is the same as that in the general Formula I), with a benzaldehyde derivative represented by the following general formula:

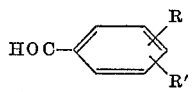

(III)

(wherein R and R' are the same as those in the general Formula I).

Alternatively the compounds of this invention can be prepared by intra-molecular ring closure under dehydration of a novel cinnamic acid-(O-oxyaryl)-amide derivative represented by general formula:

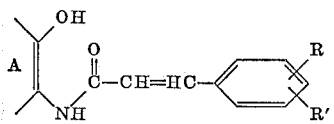

(IV)

wherein A, R and R' are the same as those in the general Formula I).

The following compounds can be cited as examples of 2-methyloxazole compound of the general Formula II among the starting materials employed for preparing the novel 2-styryloxazole compounds of this inveniton:

2-methylbenzoxazole,
2,5-dimethylbenzoxazole,
2,5,7-trimethylbenzoxazole,
2-methyl-4,5-cyclotetramethylenebenzoxazole,
2-methyl-5-ethylbenzoxazole,
2-methyl-5-isopropylbenzoxazole,
2-methyl-5-tert-butylbenzoxazole,
2-methyl-5-phenylbenzoxazole,
2-methyl-5-acetylaminobenzoxazole,
2-methyl-α-naphthoxazole,
2-methyl-β-naphthoxazole, and the like.

And also the following compounds can be cited as examples of benzaldehyde derivative of the general Formula III among the starting materials:

Benzaldehyde,
2-chlorobenzaldehyde,
3-chlorobenzaldehyde,
4-chlorobenzaldehyde,
4-bromobenzaldehyde,
4-fluorobenzaldehyde,
2-cyanobenzaldehyde,
3-cyanobenzaldehyde,
4-cyanobenzaldehyde,
4-methylbenzaldehyde,
4-phenylbenzaldehyde,
4-cyano-2-chlorobenzaldehyde,
4-cyano-3-chlorobenzaldehyde,
4-carboxylbenzaldehyde,
4-carboethoxybenzaldehyde,
2-chloro-4-carboxybenzaldehyde,
3-chloro-4-carboxybenzaldehyde, and the like.

The condensation reaction under dehydration of 2-methyloxazole compound of the gerenal Formula II with benzaldehyde derivative of the general Formula III can be carried out by taking the both starting materials at about equal molar ratio and heating at 150°–200° C. by adding or not adding a dehydrating agent.

Among the starting material, cinnamic acid-(O-oxy-aryl)-amide derivative can be easily obtained by N-acylating O-aminophenols or O-aminonaphthols, for example, 4-methyl-2-aminophenol,
4,6-dimethyl-2-aminophenol,
4-ethyl-2-aminophenol,
4-phenyl-2-aminophenol,
1-amino-2-naphthol,
2-amino-1-naphthol, and the like, or their inorganic acid salts with cinnamic acid halo-genide, for example, Cinnamic acid chloride
3-chlorocinnamic acid chloride
4-chlorocinnamic acid chloride
4-cyano-3-chlorocinnamic acid chloride is prepared according to a conventional method. The intra-molecular ring closure reaction under dehydration of cinnamic acid-(O-oxyaryl)-amide thus obtained can be carried out in an inert organic solvent such as xylene, chlorobenzene, dichlorobenzene and the like by adding a dehydrating agent and causing a reaction by heating.

The examples of novel 2-styryloxazole compounds of this invention are shown in Table 1.

TABLE 1

| No. | Structural Formula | Property and melting point | Fluorescense in benzene solution |
|---|---|---|---|
| 1 | CH$_3$-benzoxazole-C-CH=HC-C$_6$H$_4$-Cl | Colorless needle like crystals, 154–155° C | Violet. |
| 2 | H$_3$C-benzoxazole-C-CH=HC-C$_6$H$_4$-CN | Light yellow pillar-like crystals, 196–197° C | Do. |
| 3 | H$_3$C-benzoxazole-C-CH=HC-C$_6$H$_4$-C$_6$H$_5$ | Slightly yellow plate crystals, 146–147° C | Do. |
| 4 | H$_3$C-benzoxazole-C-CH=HC-C$_6$H$_4$-COOH | Light yellow pillarlike crystals, >310° C | Do. |
| 5 | H$_3$C-benzoxazole-C-CH=HC-C$_6$H$_4$-COOC$_2$H$_5$ | Colorless needlelike crystals, 141–142° C | Do. |
| 6 | H$_3$C-benzoxazole-C-CH=HC-C$_6$H$_3$(Cl)-CN | Light yellow needlelike crystals, 221° C | Do. |
| 7 | H$_5$C$_2$-benzoxazole-C-CH=HC-C$_6$H$_3$(Cl)-CN | Light yellow needlelike crystals, 155–156° C | Do. |
| 8 | H$_3$C-benzoxazole-C-CH=HC-C$_6$H$_3$(Cl)-COOH | Light yellow needlelike crystals, 260–263° C | Blue. |
| 9 | H$_3$C-(CH$_3$)benzoxazole-C-CH=HC-C$_6$H$_4$-CN | Slightly yellow needlelike crystals, 207–209° C | Blue-violet. |
| 10 | (C$_6$H$_5$)benzoxazole-C-CH=HC-C$_6$H$_5$ | Silver-white flakelike crystals, 134–136° C | Violet. |
| 11 | (C$_6$H$_5$)benzoxazole-C-CH=HC-C$_6$H$_4$-CN | Light yellow needlelike crystals, 184–185° C | Blue-violet. |
| 12 | (CH$_3$)$_3$C-benzoxazole-C-CH=HC-C$_6$H$_4$-COOH | Light yellow pillarlike crystals, 295–297° C | Violet. |

TABLE 1—Continued

| No. | Structural Formula | Property and melting point | Fluorescense in benzene solution |
|---|---|---|---|
| 13 | naphth[2,1-d]oxazole–C–CH=HC–C₆H₄–CN | Colorless flakelike crystals, 175–176° C | Violet-blue. |
| 14 | naphth[1,2-d]oxazole–C–CH=HC–C₆H₅ | Colorless needlelike crystals, 124–125° C | Blue-violet. |
| 15 | naphth[1,2-d]oxazole–C–CH=HC–C₆H₄(2-Cl) | Slightly yellow pillarlike crystals, 134–135° C | Blue. |
| 16 | naphth[2,1-d]oxazole–C–CH=HC–C₆H₅ | Light yellow pillarlike crystals, 122–123° C | Green-blue. |
| 17 | naphth[2,1-d]oxazole–C–CH=HC–C₆H₄(2-Cl) | Slightly yellow needlelike crystals, 158–159° C | Blue-green. |
| 18 | naphth[2,1-d]oxazole–C–CH=HC–C₆H₄(3-Cl) | Light yellow flakelike crystals, 114–115° C | Blue. |
| 19 | naphth[2,1-d]oxazole–C–CH=HC–C₆H₄–Cl | Yellow needlelike crystals, 159–160° C | Green-blue. |
| 20 | naphth[2,1-d]oxazole–C–CH=HC–C₆H₄–F | Light yellow pillarlike crystals, 125–126° C | Violet-blue. |

TABLE 1—Continued

| No. | Structural Formula | Property and melting point | Fluorescense in benzene solution |
|---|---|---|---|
| 21 | [naphthoxazole]-C-CH=HC-[phenyl]-Br | Greenish yellow pillarlike crystals, 185-186° C | Blue-green. |
| 22 | [naphthoxazole]-C-CH=HC-[phenyl]-CH$_3$ | Light yellow flakelike crystals, 123-124° C | Violet-blue. |
| 23 | [naphthoxazole]-C-CH=HC-[phenyl]-COOH | Yellow long flakelike crystals, >300° C | Blue. |

As shown in Table 1, the novel 2-styryloxazole compounds of this invention have fluorescence of blue violet to violet, and also show excellent affinity to organic fibrous materials from its aqueous dispersed system so that they are very useful for optical brightening of man-made fibers, particularly polyester, polyacryonitrile, polyamide, acetalized polyvinyl alcohol, polyolefin and cellulose acetate fibers and their light fastness is remarkable. For example, the compound No. 18 in Table 1 is made into aqueous dispersed system by using anionic surface active agent of alkylbenzene sulfonic acid type, and when the above-mentioned man-made fibers are treated in a treating bath which is prepared in such a way as the amount of this compound is 0.1% or 0.2% to the material to be treated, an excellent optical brightening effect can be obtained. The treating conditions and the light fastness (according to JIS L 1045-1959, xenon light source) of man-made fibers in this case are shown in Table 2.

TABLE 2

| Fiber Materials | Compound concentration (percent) | Treatment temperature (° C.) | Treatment times (min.) | Light fastness |
|---|---|---|---|---|
| Polyester | 0.2 | 120 | 45 | 4 |
| Polyacrylonitrile | 0.1 | 100 | 45 | 3 |
| Polyamide | 0.1 | 80 | 45 | 3 |
| Celluloseacetate | 0.1 | 80 | 45 | 3-4 |
| Acetalized polyvinyl alcohol | 0.1 | 80 | 45 | 3 |
| Polypropylene | 0.1 | 100 | 45 | 2-3 |

It is convenient to use a composition which is previously mixed with a surface active agent in order to treat organic fibrous materials by using the compound of this invention. For example, a composition comprising 10 parts of 2-styryloxazole compound of this invention, 10 parts of surface active agent of alkyl benzene sulfonic acid type and 80 parts of formaldehyde condensate of naphthalene sulfonic acid can be conveniently used.

The process for preparing 2-styryloxazole compounds of this invention and the method of optical brightening of organic fibrous materials by using such compounds are illustrated by the following examples. Percents and parts herein are by weight.

Example 1

2,5-dimethylbenzoxazole (14.7 parts), 4-carboxybenzaldehyde (15 parts) and zinc chloride (5 parts) are thoroughly mixed and are caused to react at 160-200° C. for 8 hours with stirring. The reactants are boiled and dissolved in methanol of 10 times volume. On cooling the methanol solution, 5-methyl-2-(4-carboxystyryl)-benzoxazole is precipitated as yellow crystals. When recrystallized from ethanol containing glacial acetic acid, light yellow pillarlike crystals (M.P. >310° C.) are obtained.

Example 2

2,5-dimethylbenzoxazole (14.7 parts), 4-cyano-3-chlorobenzaldehyde (18 parts) and zinc bromide (13 parts) are thoroughly mixed and are caused to reaction at 160° C. for 6 hours with stirring. In this case the water formed by the reaction is successively driven out of the reaction system. The reactants are boiled and dissolved in 50 parts of methanol. On cooling the methanol solution, 5-methyl-2-(4'-cyano-3'-chlorostyryl)-benzoxazole is precipitated as yellow crystals. When recrystallized from dimethyl formamide, light yellow needlelike crystals (M.P. 221° C.) are obtained.

Example 3

2,5,7-trimethylbenzoxazole (16.1 parts), 4-cyanobenzaldehyde (13.1 parts) and zinc chloride (7 parts) are mixed thoroughly and are caused to react at 160-200° C. for 8 hours with stirring while the formed water is successively taken out of the reaction system. Then, the reactants are subjected to steam distillation and unreacted starting materials are distilled out. The distillation residue is treated with hot xylene and the resulting xylene solution is allowed to cool to precipitate 5,7-dimethyl-2-(4'-cyanostyryl)-benzoxazole as yellow needlelike crystals. When recrystallized from ligroin containing benzene, slightly yellow needlelike crystals (M.P. 207-209° C.) are obtained.

Example 4

2-methyl-α-naphthoxazole (18.3 parts) benzaldehyde (11 parts) and zinc chloride (7 parts) are thoroughly mixed and are caused to react at 160–200° C. for 8 hours with stirring. To the reaction product is added methanol of 3 times volume at hot state and after cooling the precipitate is filtered out. The precipitate is recrystallized from a mixture of ethanol and glacial acetic acid to give light yellow pillarlike crystals (M.P. >300° C.). This one is a double salt of 2-styryl-α-naphthoxazole and zinc chloride. On heating with water, 2-styryl-α-naphthoxazole is easily separated. Recrystallization from ligroin gives colorless needlelike crystals (M.P. 124–125° C.).

Example 5

2-methyl-β-naphthoxazole (28 parts), 3-chlorobenzaldehyde (22 parts) and zinc chloride (10 parts) are mixed and are caused to react at 160–165° C. for 6 hours while the formed water is successively taken out of the reaction system. The reactants are dissolved in 150 parts of isopropanol. The isopropanol solution is allowed to cool to precipitate 2-(3'-chlorostyryl)-β-naphthoxazole as yellow crystals. Recrystallization from methanol gives light yellow flakelike crystals (M.P. 114–115° C.).

Example 6

Cinnamic acid - (2'oxynaphthyl-1')-amide obtained from 1-amino-2-naphthol hydrochloric acid salt (20 parts) and cinnamic acid chloride (17 parts) is boiled with 10 parts of phosphor oxychloride in 50 parts of O-dichlorobenzene for 8 hours while water formed by the reaction is successively distilled out of the system. Then, O-dichlorobenzene is taken out by steam distillation and the distillation residue is treated with ligroin. The ligroin solution is allowed to cool to precipitate 2-styryl-β-naphthoxazole as yellow crystals. Recrystallization from ligroin gives light yellow pillarlike crystals (M.P. 121.5–123° C.).

Example 7

One part of 2-(4'-cyanostyryl)-5,7-dimethylbenzoxazole of the following formula:

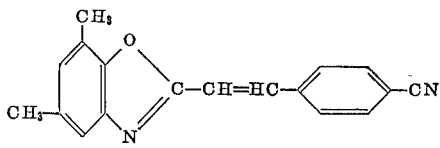

is thoroughly mixed with 9 parts of surface active agent of alkylbenzene sulfonic acid type to give a sample, and 0.2 part of the sample thus prepared per 10 parts of the polyester cloth to be treated is put into 400 parts of water to give a dispersed system. In this dispersed system the polyester cloth is treated at 120° C. for 45 minutes. The treated cloth is washed with water and dried to give the remarkable brightening effect as compared with non-treated cloth.

What is claimed is:

1. A 2-styrylbenzoxazole compound of the formula:

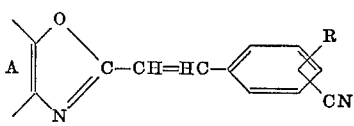

wherein A is a substituted benzene radical, which is condensed with the oxazole ring, substituents of said benzene radical being selected from the group consisting of lower alkyl-, phenyl-, and cyclotetramethylene-groups, said cyclotetramethylene group being attached to the 4,5-position of the benzoxazole ring, and R is selected from hydrogen and halogen.

2. 5 - methyl-2-(3'-chloro-4'-cyanostyryl)-benzoxazole of the formula:

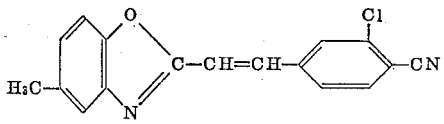

3. 5,7 - dimethyl - 2-(3'-chloro-4'-cyanostyryl)-benzoxazole of the formula:

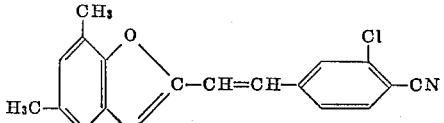

4. 5 - ethyl - 2-(3'-chloro-4'-cyanostyryl)-benzoxazole of the formula:

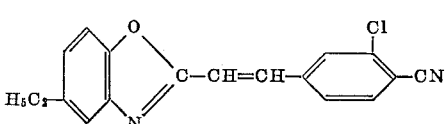

5. 5-methyl-2-(4'-cyanostyryl)-benzoxazole of the formula:

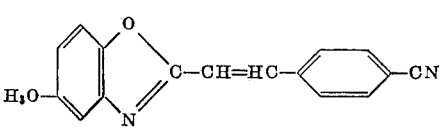

6. 4,5 - cyclotetramethylene - 2-(4'-cyanostyryl)-benzoxazole of the formula:

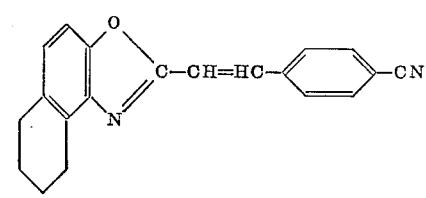

7. 5-phenyl-2-(4'-cyanostyryl)-benzoxazole of the formula:

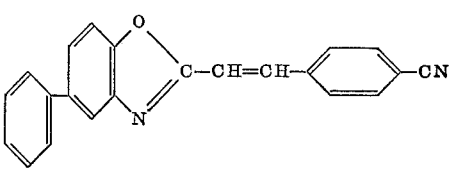

References Cited by the Examiner

UNITED STATES PATENTS

| | | |
|---|---|---|
| 2,639,282 | 5/1953 | Sprague et al. ___ 260—240.9 XR |
| 2,875,089 | 2/1959 | Ackermann et al. ____ 117—33.5 |
| 2,953,561 | 9/1960 | Doorenbos _____ 260—240 |
| 3,158,610 | 11/1964 | Buell _____ 260—240 |

FOREIGN PATENTS

| | | |
|---|---|---|
| 669,402 | 4/1952 | Great Britain. |
| 578,303 | 6/1959 | Canada. |
| 1,248,230 | 10/1960 | France. |

OTHER REFERENCES

Bartkowicz: Przemysl Chemiczny, vol. 12, pages 146–149 (1956).

Beilstein's Handbuch der Organischem Chemie, vol. 27 (4th ed.), pages 83 to 84 (system No. 4203) and 385–6 (system No. 4349), Verlag van Julius Springer; Berlin, Germany (1937).

Brown et al.: J. Chem. Soc. 1948, pages 2147–2154.

(Other references on following page)

Chemical Abstracts, vol. 52, pages 394-5 of subject index under benzothiazole, 2-styryl at page 395s and col. 10728a (1958) [abstract of Weber et al., Croat. Chem. Acta, vol. 29, pages 115-25 (1957)].

Postovskii et al.: Zh. Obsch. Khim., vol. 32, pages 2617-2624 (July 1962).

Ser. No. 419,570, Riester (A.P.C.), published Apr. 20, 1943.

WALTER A. MODANCE, *Primary Examiner.*

IRVING MARCUS, NICHOLAS RIZZO, JOHN D. RANDOLPH, *Assistant Examiners.*